United States Patent [19]

Kimberly

[11] 3,851,695
[45] Dec. 3, 1974

[54] TUBELESS TIRE BEAD SEATING MACHINE

[75] Inventor: Bobby G. Kimberly, Albertville, Ala.

[73] Assignee: Bomar Manufacturing Company, Inc., Boaz, Ala.

[22] Filed: Feb. 2, 1973

[21] Appl. No.: 328,946

Related U.S. Application Data

[63] Continuation of Ser. No. 228,708, Feb. 23, 1972, which is a continuation of Ser. No. 89,773, Nov. 13, 1970, abandoned.

[52] U.S. Cl. ............................................... 157/1.1
[51] Int. Cl. .......................................... B60c 25/12
[58] Field of Search ...................................... 157/1.1

[56] References Cited
UNITED STATES PATENTS

| | | | |
|---|---|---|---|
| 2,936,827 | 5/1960 | Riggs | 157/1.1 |
| 3,528,474 | 9/1970 | May | 157/1.1 |
| 3,552,469 | 1/1971 | Corless | 157/1.1 |

Primary Examiner—Al Lawrence Smith
Assistant Examiner—Harold P. Smith, Jr.
Attorney, Agent, or Firm—Jones, Thomas & Askew

[57] ABSTRACT

A machine in the form of a stand for pneumatically seating the beads of a tubeless tire on the flanges of a wheel on which the tire is loosely mounted. The stand has a lower portion forming a surge tank, an upwardly opening cylindrical well having a ring tube at the top to support the tire horizontally with the wheel sagging into the well, and a foot pedal valve and conduit for admitting a surge of air from the tank to the ring tube for discharge through orifices toward the wheel to quickly bulge the lower tire bead into sealing relation with the wheel.

10 Claims, 4 Drawing Figures

INVENTOR
BOBBY G. KIMBERLY

BY
Mason, Fenwick & Lawrence
ATTORNEYS

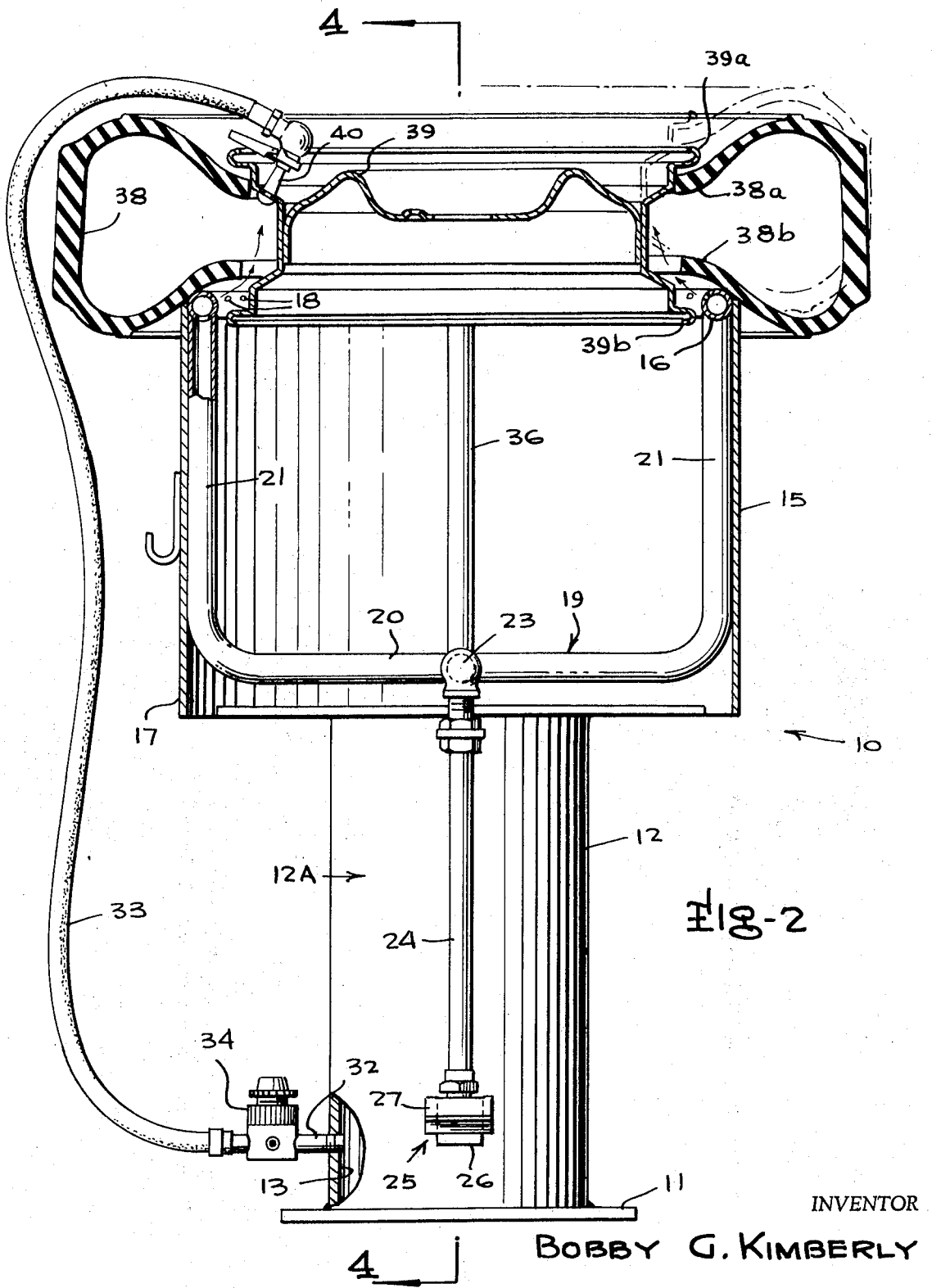

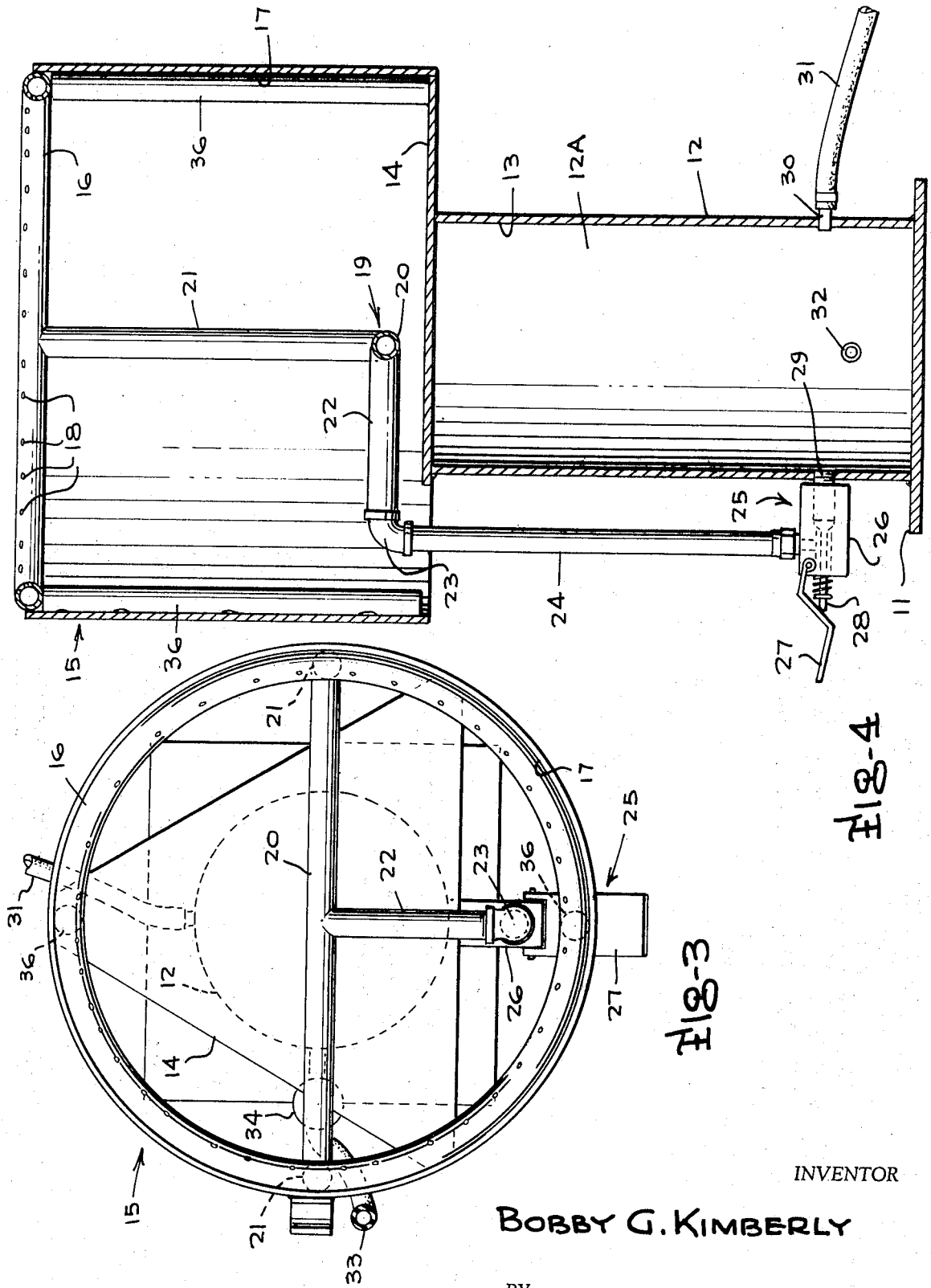

TUBELESS TIRE BEAD SEATING MACHINE

BACKGROUND AND OBJECTS OF THE INVENTION

This is a continuation of copending application Ser. No. 228,708, filed Feb. 23, 1972, now abandoned, which was in turn a continuation of application Ser. No. 89,773 filed Nov. 13, 1970, now abandoned.

The present invention relates to a machine for pneumatically seating the beads of tubeless tires on the flanges or rims of wheels on which the tires are to be mounted to facilitate mounting and inflation of the tubeless tires.

Conventional tire inflating apparatus for use with prior types of automobile tires having innertubes was not suitable for mounting tubeless tires on wheels in the absence of special facilities for setting of the tire beads on both wheel flanges with a sufficient seal to prevent the relatively small flow of air through a conventional valve stem from escaping through open gaps between the tire beads and wheel flanges. This problem has been particularly acute for tires that have been wrapped and/or stacked for a period of time as the tire beads then become temporarily set at positions closer together than the sealing flanges on the wheel on which they are to be mounted.

Various devices, in the nature of inflatable or otherwise contrastible belts, have been made to squeeze the tread of the tire along the outer circumference to cause the tire beads to bulge outwardly into sealing contact with the wheel flanges until an initial sealing inflation could be effected. However, such devices have frequently been inadequate to rapidly secure a proper seal where the tire beads had become temporarily set closer together through wrapping or stacking, and in many cases it has been found that such belt-like squeezing devices will not stay on radial tires and may break the fiberglas belting of fiberglas reinforced tires.

An object of the present invention is the provision of novel apparatus or machine in the form of an upright supporting stand on which a loosely mounted wheel and tubeless tire can be placed and which can be conveniently operated to rapidly seat the tire beads on the wheel flanges and then inflate the tire to desired pressure without requiring attendance of the operator during the inflation procedure.

The apparatus of the present invention is a single unitized device or machine on which a loosely assembled tire and wheel can be placed. The machine is provided with a ring at the top to form an annular support for the tire and to discharge a surge of air from a location between the inner or lower wheel flange and the lower side of the tire in an appropriate direction relative to the confronting portion of the wheel to inject a sufficient surge of air pressure into the tire to cause the lower bead to quickly bulge downwardly into sealing contact with the wheel flange. The upper bead is gravitationally maintained in sealing contact with its companion wheel flange by the weight of the wheel while the tire is supported on the ring. The ring is supported above a stationary surge tank forming a lower pedestal portion for the machine, and is of sufficient diameter to engage and support the lower side wall of the tires of conventional size while the lower wheel rim occupies a position slightly below the level of the ring. A foot pedal valve is associated with the surge tank to admit the surge of air to the ring for causing the bead of the lower tire side wall to bulge into sealing relation with the wheel flange. A normal size inflation hose also connects to the surge tank and has a lock-on type ball chuck clip which may be coupled to the valve mounted in the wheel so that inflation can continue through the normal inflation hose without requiring attention of the operator. A pressure regulator can be provided at the inflation hose line connection to the surge tank to terminate inflation when the desired pressure is reached.

Other objects, advantages and capabilities of the present invention will become apparent from the following detailed description, taken in conjuction with the accompanying drawings illustrating a preferred embodiment of the invention.

BRIEF DESCRIPTION OF THE FIGURES

FIG. 2 is a vertical section view taken along the line 2—2 of FIG. 1;

FIG. 3 is a top plan view of the machine; and

FIG. 4 is a vertical section view through the pedestal portion and immediately adjoining the upper portion of the machine taken along the line 4—4 of FIG. 2.

DETAILED DESCRIPTION OF A PREFERRED EMBODIMENT

Figure 1:
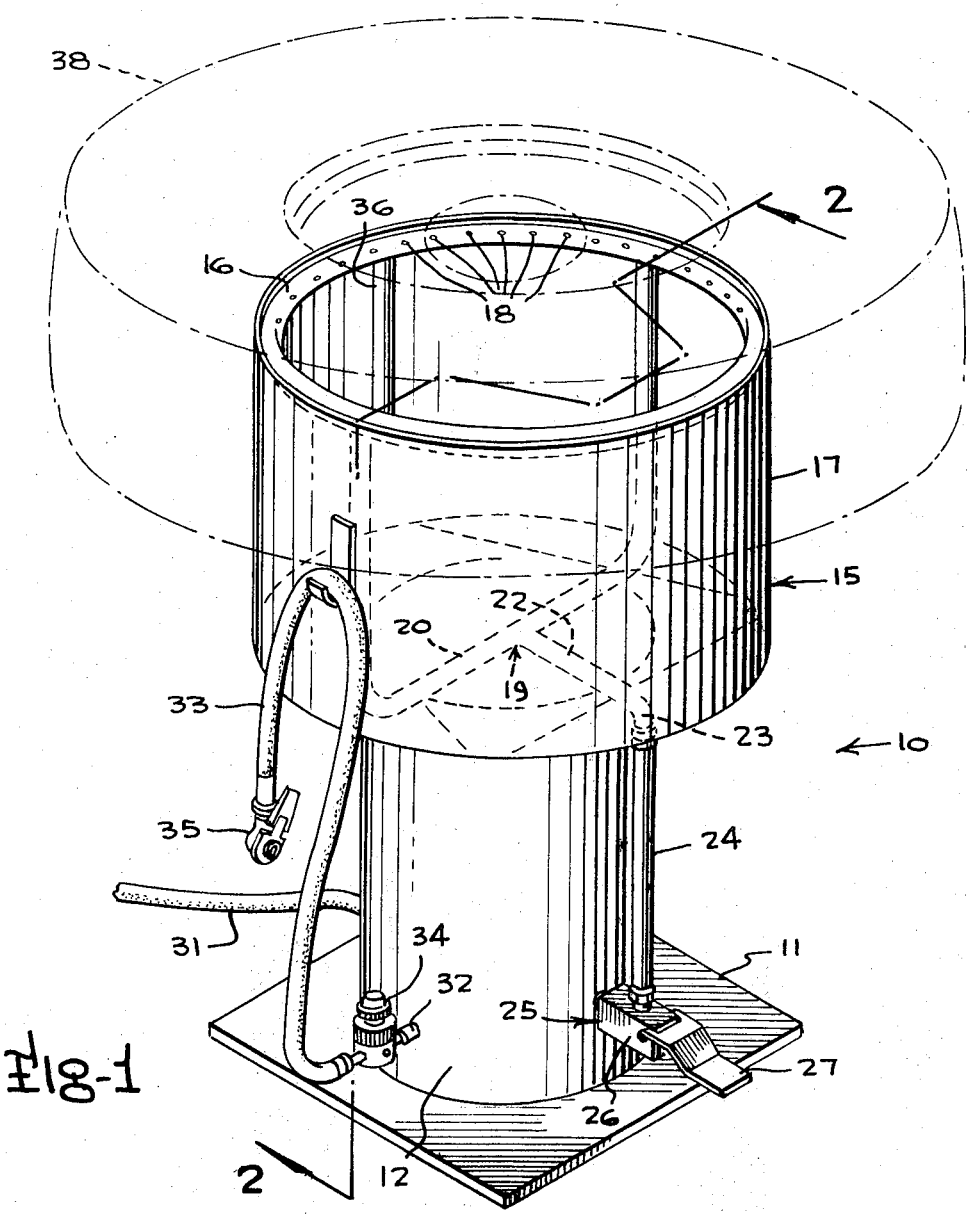
FIG. 1 is a perspective view of a tubeless tire bead seating machine embodying the present invention.

Referring to the drawings, wherein like reference characters designate corresponding parts throughout the several figures, the tubeless tire bead seating machine of the present invention is indicated generally by the reference character 10 and is arranged generally in the form of an upright stand formed of a smaller diameter lower cylindrical portion and a larger diameter upper cylindrical portion. The machine includes a flat rectangular base plate 11, for example a square plate having 12 inch sides, on which is fixed an upright cylindrical pedestal section 12 formed for example 8 inch inner diameter metal thin wall pipe, for example three-sixteenths inch thick, to define a cylindrical surge tank 12A having a vertical height of about 18 inches. The cylindrical wall 13 of the pedestal section 12 is welded along its lower edge to the base plate 11, providing a gas tight seal for the bottom of the surge tank 12A. The upper end of the tank 12A is closed by a triangular plate 14 having slightly truncated corners, for example a one-quarter inch metal plate having 15½ inch sides, which is welded to the upper edges of the cylindrical wall 13 to form the pedestal into the cylindrical air storage tank or surge tank.

The triangular plate 14 forms the supporting base for the larger diameter upper cylindrical well section 15 which is in the form of an upwardly opening cup-shaped formation about 14 inches high and 19 inches in outer diameter, having an air discharge ring 16 at the top. The ring 16 is located in a horizontal plane and forms an annular support against which the inner or lower side wall of the tire rests while the inner or lower flange of the wheel depends below the bead of the lower tire side wall into the upwardly opening cavity defined by the well section 15. The outer wall of the well section 15 is a cylindrical shell 17 of sheet metal, for example 14 gauge sheet metal, welded to the corners of the triangular plate 14 and also spot welded to the ring 16 at the upper edge of the shell to reinforce the shell in cylindrical shape. The air discharge ring 16 is a 1 inch diameter thin wall conduit curved to a circular configuration of approximately 17 inches inner diameter and having a plurality of openings 18, for example 7/32nd inch holes, drilled along upwardly and inwardly inclined angles of about 57° relative to the vertical. A U-shaped conduit 19 formed, for example, of 18 gauge tubing of approximately 1 inch diameter, includes a horizontal cross-leg 20 extending diametrically across the upper cylindrical section 15 and vertical legs 21 having upper ends which are welded to the ring 16 at openings in the ring which correspond to the bores of the legs 21. A supply conduit section, for example of ¾ inch pipe indicated at 22 is welded to the center of the horizontal leg 20 at an opening in pipe 20, and extends horizontally from the vertical center axis of the machine to a position outwardly of one of the sides of the triangular plate 14 to a 90° ell 23 which is connected by a pipe union and ¾ inch pipe 24 extending downwardly along the side of the pedestal section 12 at the front thereof to a foot pedal controlled surge valve 25 at the lower end of the pipe 24.

The foot pedal control surge valve may, for example, comprise a value body 26 to which a pedal 27 is pivoted having an inclined offset portion which bears against and actuates a spring biased valve stem 28 projecting from the valve body 26. The valve body is connected at its top to the ¾ inch pipe 24 and is connected to a ¾ inch nipple 29 fitted in an opening in the wall of the surge tank 12A at the front of the machine. A compressed air inlet fitting 30 is provided in the wall of the pedestal section 12 at the rear of the pedestal section in the illustrated embodiment, for connection to a supply hose 31 extending to the compressed air supply for the service station or tire changing facility. Another pipe nipple, for example a ¼ inch pipe nipple 32, forms an outlet from the surge tank for the regular inflation hose 33, which is normally a ¼ inch hose. The inflation hose 33 has a conventional pressure regulator 34, for example having a 50 p.s.i. maximum pressure setting, interposed in the inflation line to cut off the air supply through the inflation hose when the pressure in the tire reaches a certain pre-selected inflation pressure level, and a conventional lock-on type ball chuck clip 35 is provided on the other end of the inflation hose 33 to permit the chuck 35 to be locked on to the tire valve by the operator or attendant, so that inflation of the tire can continue after the bead has been sealed without the attendant having to be present. The lock-on type ball chuck clip 35 is of the conventional type wherein a slit is provided in the annular chuck portion which fits over the threaded end of the valve body, through which a tongue member of the lock-on ball chuck clip unit can fit to engage the threads on the valve body and retain the chuck assembled on the valve.

In addition to the U-shaped conduit member 19, the upper cylindrical well section 15 includes a pair of diametrically opposite vertical tube members 36, which may be termed false tubes since they do not convey any air to the ring 16. These additional tube members 36 are disposed in a vertical diametric plane at right angles to the plane of the U-shaped conduit member 19 and are welded at their tops to the ring 16 and along their sides to the shell 17. The additional tube members 36 are provided to assist in keeping the wheel in appropriate alignment within the cavity defined by the well section so that the lower wheel flange will not catch under the air discharge ring 16.

In the use of the tubeless tire bead sealing machine 10 of the present invention, the attendant merely loosely mounts the tubeless tire, indicated at 38 in FIG. 2, on the wheel 39, with the valve portion 40 mounted in the wheel, and lays the loosely mounted tire and wheel assembly on the air discharge ring 16 at the upper end of the cylindrical well section 15 of the machine at the position shown in FIG. 2, wherein the lower side wall of the tire 38 rests on the air discharge ring 16. The 17 inch inner diameter of the cavity circumscribed by the ring 16 is sufficient to accommodate the usual diameters of automobile wheels, which are customarily 13 inches, 14 inches or 15 inches. The weight of the wheel 39 causes the upper wheel flange 39a to seal against the upper bead 38a of the tire 38 while the lower wheel flange 39b sags into the cavity or well of the upper section 15 to a level as low as or somewhat below the mid-plane of the ring 16, in approximately the position illustrated in FIG. 2. It will be noted that the lower side wall of the tire 38 rests upon the ring 16 and carries the weight of the loosely mounted tire and wheel assembly, so that the lower bead 38b is spaced above the lower wheel flange 39b providing a space which faces the holes 18 in the air discharge ring 16. The attendant then steps on the operating pedal 27 of the foot pedal control valve 25, opening the valve 25 to release a surge of air from the surge tank 12A. This communicates as a blast or surge of high pressure air through the ¾ inch pipe sections 24 and 22 and the 1 inch U-shaped conduit member 19 to the air discharge ring 16, where the air discharges through the holes 18 facing the space between the lower tire bead 38b and the lower wheel flange 39b. This surge or burst of air passes between the lower bead and flange into the interior of the tire producing sufficient pressure to cause the lower bead 38b to quickly bulge downwardly and seal the lower bead against the lower wheel flange while the upper bead maintains its seal with the upper wheel flange. The lock-on type ball chuck clip 35 on the end of the inflation hose 33 will have been locked on the wheel valve 40 immediately prior to operating the foot pedal control valve 25 or may be applied immediately after the beads have been sealed by the injection of the surge of high pressure air into the tire, and inflation of the tire then continues in the normal manner through the inflation hose 33 until the proper inflation pressure is reached in the tire, whereupon the pressure regulator 34 terminates further inflation air supply to the tire.

The normal pressure of the source supplying air to the surge tank 12A would be a minimum of 120 p.s.i. and preferably in the range 140 to 160 p.s.i. During the periods when the machine is idle, the pressure in the surge tank 12A builds up to the supply pressure of preferably 140 to 160 p.s.i., and the size of the surge tank in the example having the dimensions described previously is just enough to provide an appropriate surge to seat the tire after which inflation continues in the normal manner through the inflation hose 33.

What is claimed is:

1. A machine for pneumatically seating the beads of a tubeless tire on the flanges of a wheel on which the tire had been loosely mounted, comprising a stationary upright supporting stand including a cylindrical upper section defining an upwardly opening cylindrical well and a lower pedestal section for supporting the upper section at a selected elevation above a floor, the upper section being concentric with a vertical axis, said upper section including an air conduit in the form of a stationary ring tube arranged in a horizontal plane at the top of the upper section forming an annular support against which the lower side wall of a tire will rest and providing a circular center opening of sufficient diameter to pass the lower wheel flange of the associated wheel downwardly therethrough, the ring tube having a plurality of circumferentially spaced air outlet openings for directing air toward the region between the lower wheel flange and lower tire bead to be injected into the tire, said stand including means defining a stationary surge tank having means for connection to a source of pressurized air to store a quantity of air at a selected pressure, and a valve regulated surge supply conduit communicating the surge tank with said ring tube to supply a surge of high pressure air to said ring tube for discharge through said air outlet openings toward the space between the lower tire bead and lower wheel flange and into the tire resting on the ring tube to quickly bulge said lower bead into sealing relation with the wheel flange.

2. A machine as defined in claim 1, wherein said lower pedestal section is a closed cylindrical tank concentric with said vertical axis and forming said surge tank, and said surge supply conduit including a foot pedal operated valve adjacent the bottom of said pedestal section for admitting the surge of pressurized air through said conduit to the ring tube.

3. A machine as defined in claim 1, including an inflation hose connected at one end to the surge tank and having a lock-on chuck member on the free end of the hose to be releasibly coupled onto the end of a tire valve.

4. A machine as defined in claim 2, including an inflation hose connected at one end to the surge tank and having a lock-on chuck member on the free end of the hose to be releasibly coupled onto the end of a tire valve.

5. A machine as defined in claim 1, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof and rigid conduit piping connected to said cross portion and to said surge tank to communicate the surge of pressurized air through said piping and conduit member to the ring tube.

6. A machine as defined in claim 2, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof and rigid conduit piping connected to said cross portion and to said surge tank to communicate the surge of pressurized air through said piping and conduit member to the ring tube.

7. A machine as defined in claim 3, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof and rigid conduit piping connected to said cross portion and to said surge tank to communicate the surge of pressurized air through said piping and conduit member to the ring tube.

8. A machine as defined in claim 1, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof, rigid conduit piping connected to said cross portion and to said surge tank to communicate the surge of pressurized air through said piping and conduit member to the ring tube and a cylindrical shell of sheet metal encircling said ring tube and conduit member and connected to the ring tube and said vertical leg portions defining a cylindrical wall surrounding said well.

9. A machine as defined in claim 2, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof, rigid conduit piping connected to said cross portion and to said surge tank to communicate the surge of pressurized air through said piping and conduit member to the ring tube and a cylindrical shell of sheet metal encircling said ring tube and conduit member and connected to the ring tube and said vertical leg portions defining a cylindrical wall surrounding said well.

10. A machine as defined in claim 3, wherein said upper section includes a U-shaped tubular conduit member having a cross portion diametrically spanning said upper section at the lower portion thereof, upwardly projecting vertical leg portions at the opposite ends of the cross portion connected at their upper ends to said ring tube in communication with the interior thereof, rigid conduit piping connected to said cross portion and to said surge tank to communicate the surge of pressurized air through said piping and conduit member to the ring tube and a cylindrical shell of sheet metal encircling said ring tube and conduit member and connected to the ring tube and said vertical leg portions defining a cylindrical wall surrounding said well.

* * * * *